Sept. 20, 1927.
H. H. DUKE
1,642,845
ARTICLE OF MANUFACTURE SUITABLE FOR FLOOR COVERING
Filed Dec. 6, 1923
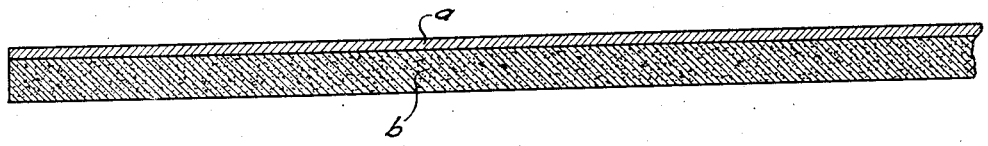

Patented Sept. 20, 1927.

1,642,845

UNITED STATES PATENT OFFICE.

HAROLD HILL DUKE, OF ROCKDALE, SYDNEY, NEW SOUTH WALES, AUSTRALIA.

ARTICLE OF MANUFACTURE SUITABLE FOR FLOOR COVERING.

Application filed December 6, 1923. Serial No. 679,036.

This invention relates to an article of manufacture suitable for covering floors, and the object of the invention is to provide a floor covering which will be sound proof, sanitary, practically fireproof, which will lie flat, and which will not warp or creep.

This article of manufacture consists of two layers $a$ and $b$. The layer $a$ is composed of the following ingredients combined in approximately the proportions stated, viz:—

| | Parts. |
|---|---|
| Granulated cork | 4 |
| Rubber | 1 |

The layer $b$ is composed of the following ingredients combined in approximately the proportions stated—

Soft rubber mixed with the usual vulcanizing ingredients in the well known proportions according to hardness required sufficient to form a thin layer on bottom of mould.

Pigment of any colour sufficient to thoroughly impregnate the required quantity of soft rubber.

In order to render the composition practically fireproof two parts of shredded asbestos may be added to ingredients ($a$).

The ingredients ($a$) are to be thoroughly mixed together in any well known mixing machine with the addition of the usual vulcanizing ingredients sulphur, litharge and/or lime in the desired well known proportions, according to the hardness required when vulcanized.

The ingredients ($b$) are thoroughly mixed and repeatedly rolled until the pigment is uniformly incorporated and when they have been finally rolled into a sheet of uniform thickness are placed in the bottom of a suitable mould of any desired size or shape.

The mixed ingredients ($a$) are then placed in the mould on top of the ingredients ($b$) and subjected to pressure until brought to the desired thickness.

The mould is then placed in a heated chamber and the compressed ingredients vulcanized in the usual way.

The sheet when removed from the mould has on one side a thin facing of coloured rubber which may have a matt surface or be highly polished according to the preparation of the mould bottom.

I am aware that compressed granulated cork sheets have been used for a floor covering, but I am not aware that the ingredients stated above have been combined for the purpose.

The drawing represents a diagrammatic view of the material.

I claim:—

1. An article of manufacture suitable for floor covering, comprising a layer consisting of approximately four parts of granulated cork, one part of rubber, and vulcanizing ingredients according to the hardness required, and a second layer consisting of soft rubber with vulcanizing ingredients and coloring matter, said layers being vulcanized together under pressure.

2. An article of manufacture suitable for floor covering comprising a layer consisting of approximately four parts of granulated cork, one part of rubber, vulcanizing ingredients according to the hardness required, and two parts of shredded asbestos, and a second layer consisting of soft rubber with vulcanizing ingredients and coloring matter, said layers being vulcanized together under pressure.

In testimony whereof he has affixed his signature.

HAROLD HILL DUKE.